(12) United States Patent
Tingley (10) Patent No.: US 7,628,882 B2
(45) Date of Patent: Dec. 8, 2009

(54) ADD ROLLER FOR A FIBER PLACEMENT MACHINE

(75) Inventor: Mark Curtis Tingley, Hutsonville, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 651 days.

(21) Appl. No.: 11/510,189

(22) Filed: Aug. 25, 2006

(65) Prior Publication Data

US 2007/0044899 A1  Mar. 1, 2007

Related U.S. Application Data

(60) Provisional application No. 60/711,224, filed on Aug. 25, 2005.

(51) Int. Cl.
 *B65H 81/00* (2006.01)
(52) U.S. Cl. ............... 156/256; 156/186; 156/173; 156/175; 156/264; 156/523; 156/574
(58) Field of Classification Search ............... 156/166, 156/173, 175, 164, 156, 523, 574
See application file for complete search history.

(56) References Cited

U.S. PATENT DOCUMENTS

| 4,867,834 | A | * | 9/1989 | Alenskis et al. | ............. 156/433 |
| 5,110,395 | A | * | 5/1992 | Vaniglia | ............. 156/353 |
| 5,290,389 | A | * | 3/1994 | Shupe et al. | ............. 156/425 |

* cited by examiner

*Primary Examiner*—Jeff H Aftergut
(74) *Attorney, Agent, or Firm*—Reinhart Boerner Van Deuren P.C.

(57) ABSTRACT

An apparatus and invention are provided for accelerating an added tow to match the lay-down speed of other tows exiting a compaction roller of a fiber placement head, by driving the added tow with an add roller operatively coupled to be driven at the same peripheral speed as a feed roller having a peripheral speed matching the peripheral speed of the compaction roller.

11 Claims, 7 Drawing Sheets

ADD ROLLER FOR A FIBER PLACEMENT MACHINE

CROSS-REFERENCE TO RELATED PATENT APPLICATIONS

This patent application claims the benefit of U.S. Provisional Patent Application No. 60/711,224, filed Aug. 25, 2005, which includes as an attachment thereto a copy of U.S. patent application Ser. No. 11/111,498, filed Apr. 21, 2005, which claims the benefit of U.S. Provisional Patent Application No. 60/563,921, filed Apr. 21, 2004, with the teachings and disclosures of all of these related patent applications being incorporated herein in their entireties by reference thereto.

FIELD OF THE INVENTION

This invention relates to the forming of composite structures with automated fiber placement machines, and more particularly to adding a tow of material on-the-fly.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Individual tapes or tows are manipulated by the fiber placement machine to form a band of material that is deposited onto a tool. Parts are built up layer-by-layer, with tapes or tows of composite material, with the angle at which each layer "ply" is laid onto the tool being precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal loads paths, which potentially results in lighter structures and lower costs than in structures made by other production methods.

During the fiber placement process, it is sometimes necessary to cut and stop the feed of individual tows, thus removing them from the band of material, in order to reduce the width of the band so that it may be placed onto the surface of the mold or tool in a manner that precludes having excessive gaps between successive bands of material, or having the edges of successive bands of material overlap one another. In similar fashion, it is often desirable to add tows to the band in order to increase its width, at various stages of the automated fiber placement process, in order to facilitate manufacture of the composite structure. The process of removing or adding tows is commonly referred to "cut and add" (cut/add).

Automated fiber placement machines are capable of depositing material onto a tool surface at high feed-rates, of, for example, 1200 inches/minute or higher. For maximizing productivity, it is desirable to operate an automated fiber placement machine at such high feed-rates throughout the fabrication of a composite structure. It is highly desirable, therefore, that automated fiber placement machines be capable of modifying the width of the band of material being applied without stopping, or slowing down, the machine to cut or add tows to the material band. In the vernacular of the automated fiber placement industry, it is highly desirable that automated fiber placement machines be capable of cutting or adding tows "on-the-fly."

In order to cut or add tows to the material band on-the-fly, the cut/add process must take place in real time. The components of the automated fiber placement machine which perform and control the cut/add process are incapable of instantaneously cutting or adding a tow to the band of material, due to inherent and unavoidable lag times or other latencies in the operation of mechanical, hydraulic, pneumatic, or electrical actuation and control components of the automated fiber placement machine. These unavoidable and inherent latencies result in the end of a cut or added tow often being positioned well outside of the tolerances required for constructing the composite structure where on-the-fly cut/add is attempted at full operating speed using prior fiber placement machines.

The problems described above, with regard to cut/add operations, are also encountered in other operations performed at high-speed on-the-fly during fabrication of a composite structure, such as changing tension, temperature, or pressure applied on a tow or the material band during automated fiber placement.

Commonly assigned U.S. patent application Ser. No. 11/111,498, filed Apr. 21, 2005, entitled, PERFORMING HIGH SPEED EVENTS "ON-THE-FLY" DURING FABRICATION OF A COMPOSITE STRUCTURE BY AUTOMATED FIBER PLACEMENT, which is incorporated herein in its entirety by reference, provides a description of various processes performed on-the-fly during an automated fiber placement process.

The invention provides an improved method and apparatus for performing a high-speed event in an automated fiber placement process by initiating the high-speed event prior to the fiber placement head reaching a location along a tool path of the fiber placement head at which it is desired to have the high-speed event completed.

In one form of the invention, a method is provided for performing a high-speed event in an automated fiber placement process using a fiber placement head of a fiber placement machine for fabricating a composite structure. The method includes determining a time-based tool path for the fiber placement head during fabrication of the composite part, with the time-based tool path including a completion location of the fiber placement head along the tool path at which it is desired to have completed the high-speed event. An initiation location of the fiber placement head along the tool path is also determined. The initiation location is disposed sufficiently in advance of the completion location, along the tool path, such that initiation of the desired high-speed event at the initiation location of the fiber placement head results in completion of the desired high-speed event substantially at the completion location of the fiber placement head.

A method, according to the invention, may further include initiating the desired high-speed event substantially at the initiation location of the fiber placement head along the tool path. The high-speed event may also be performed according to a desired process.

The invention may also include determining a latency value for the fiber placement machine to perform the high-speed event, with the latency value being used for determining the initiation location of the fiber placement head along the tool path.

The invention may also take the form of an apparatus or method for determining and tabulating a desired position during fabrication of the composite structure for starting or stopping the desired high-speed event, determining and tabulating a completion location of the fiber placement head along the tool path for each desired position for starting or stopping the high-speed event, and determining and tabulating an initiation location of the fiber placement head for starting or stopping at least one of the high-speed events. A method or apparatus, according to the invention, may further include provision for determining and tabulating latency values for the fiber placement machine to perform the high-speed event, and using the tabulated latency values for determining the initiation location of the fiber placement head along the tool path.

The invention may also take the form of a method, apparatus, or software including a computer readable medium having computer executable instructions for practicing the invention.

Although apparatuses and methods built and operated in accordance with the Assignee's commonly assigned U.S. patent application Ser. No. 11/111,498, provides significant improvements in the accuracy with which tows can be added during high-speed fiber placement, it has been found that the configuration and operation of prior add roller apparatuses, used for initiating the feeding of tows to be added, can be a limiting factor, due to inherent rotational inertias, and drag, which must be overcome in the prior apparatuses, before the tow to be added can be brought up to the same speed as other tows in the ply.

In order to effectively add plys on-the-fly, it is necessary that the added ply be brought up to a speed matching the speed at which existing plys are being laid down by the fiber placement head. If this is not accomplished, the added ply will tend to bunch up or be improperly placed.

Figure 1:
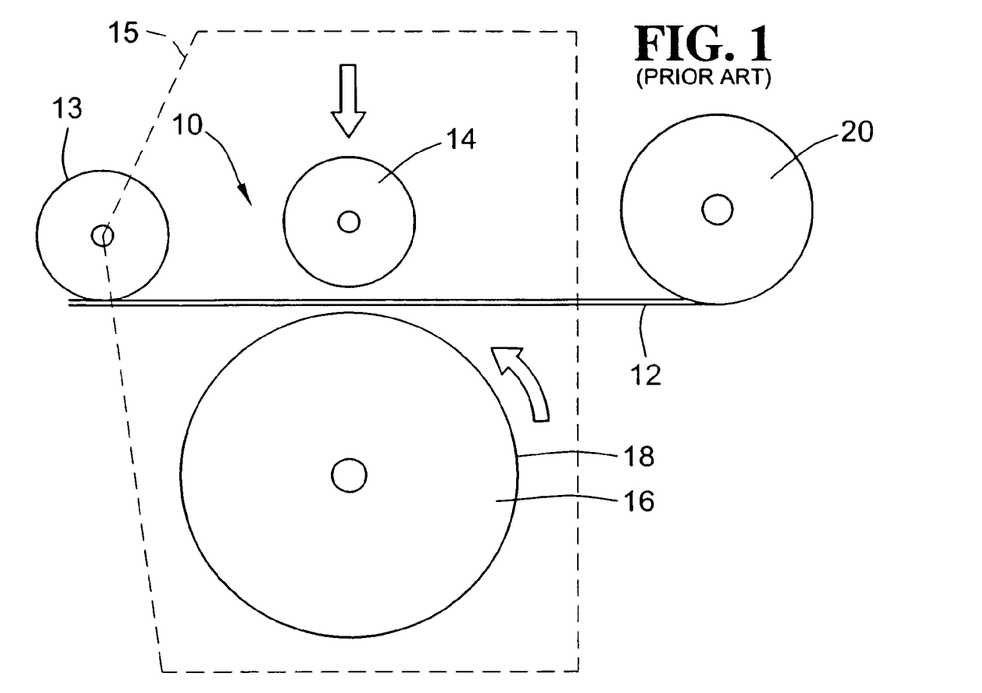
FIGS. 1-3 illustrate salient aspects of the construction and operation of prior add roller apparatuses and methods.
Figure 2:
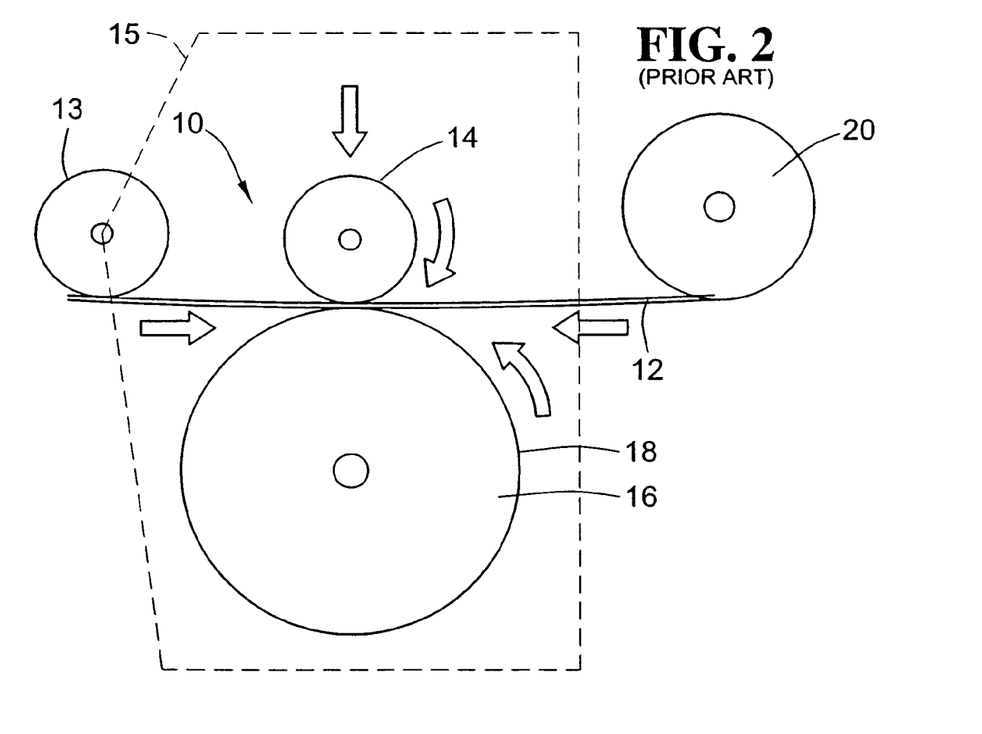

As shown in FIGS. 1 and 2, in prior add roll apparatuses 10, when it is desired to add a tow 12 to a band of tows (not shown) being laid down by a fiber placement head (not shown), and add roller 14 is forced toward a feed roller 16, to thereby clamp the added tow 12 between the add roller 14 and a driving surface 18 of the feed roller 16, in such a manner that the tow 12 is fed from a spool 20 to the fiber placement head. Each of the tows in the band of tows being laid down by the fiber placement head has associated with it a respective add roller 14, with the feed roller 16 generally extending completely across the band of tows, and serving as a common drive source for feeding the tows in the band out to the fiber placement head.

Figure 3:
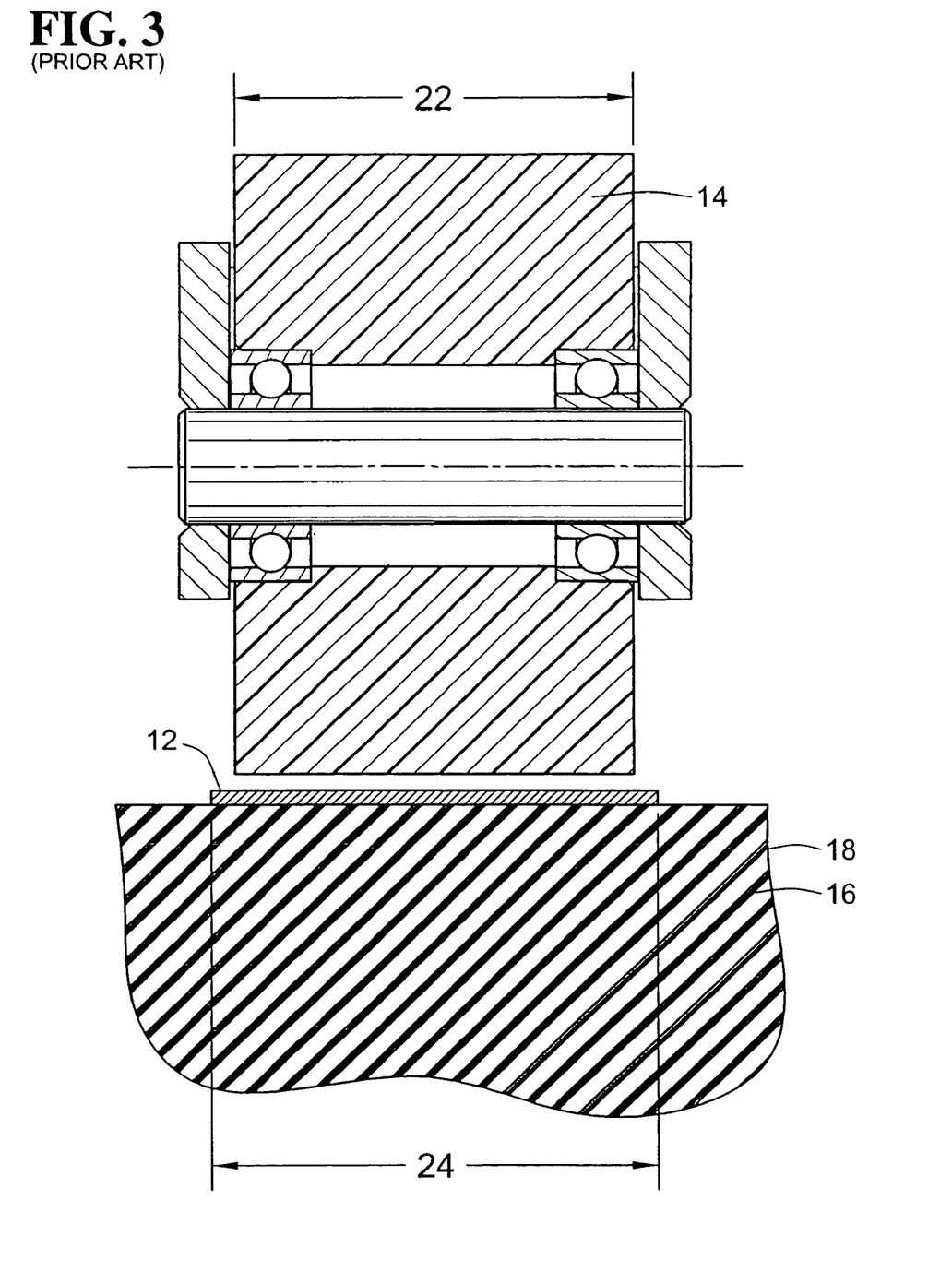

As shown in FIG. 3, prior add roller apparatuses and methods have utilized add rollers 14 having an add roller width 22 which is narrower than the tow width 24.

As a result of the add roller width 22 being narrower than the tow width 24, the add roller 14 was never brought into direct contact with the rotating feed surface 18 of the feed roller 16 directly. This results in an inefficient arrangement for transferring rotational force through the added tow 12 to the add roller 14, in order to drive the add roller 14 up to a speed matching the add rollers of other plys already being laid down at high speed by the fiber placement head. The time required to spin the add roller up to the same speed as other add rollers, and the transferred rotational energy which must be diverted through the added tow 12 for bringing the add roller 14 up to speed creates an undesired delay, and limits efficiency and effectiveness of the process of adding the tow 12 to the band of tows being laid down by the fiber placement head.

It is desirable, therefore, to provide an improved method and/or apparatus for automatically ensuring that an added tow is brought up to the same speed as existing tows passing over a feed roller of a fiber placement head, more quickly, and with greater efficiency and effectiveness than has heretofore been possible with prior add roller apparatuses and methods. It is also desirable, that such an improved method and apparatus, be usable in apparatuses and methods such as those laid out in commonly assigned U.S. patent application Ser. No. 11/111, 498, and also in add roller apparatuses and methods not utilizing the improved methods and apparatuses of commonly assigned U.S. patent application Ser. No. 11/111,498.

BRIEF SUMMARY OF THE INVENTION

The invention provides an apparatus and/or method for accelerating an added tow to match the lay-down speed of other tows exiting a compaction roller of a fiber placement head, by driving the added tow with an add roller operatively coupled to the driven at the same peripheral speed as a feed roller having a peripheral speed matching the peripheral speed of the compartment roller.

In one form of the invention, the add roller extends beyond one or both sides of the added tow, and contacts the outer periphery of the feed roller, in such a manner that the added tow drive roller is driven at the same peripheral speed as the compaction roller. In other forms of the invention, a drive mechanism, such as a gear train, may be utilized for driving the add roller from the compaction roller, in such a manner that the peripheral speeds of the two rollers are matched.

In an add roller apparatus, according to the invention, for clamping a fiber tow against a feed surface of a feed roller of a fiber placement head of an automated fiber placement machine, where the fiber tow has a tow width and the feed roller has a feed surface width greater than the tow width, the add roller apparatus may include an add roller having a width greater than the tow width, but less than the feed surface width, and configured for bearing at least partially against the feed surface of the feed roller, when the add roller is clamping the fiber tow against the feed surface of the feed roller. The add roller may have a pliable peripheral surface thereof, which is conformable over the fiber tow, so as to simultaneously contact both the fiber tow and the feed roller. Where the fiber tow has a tow thickness thereof, the add roller may include one or more protruding flanges thereof, extending outward from the peripheral surface of the add roller, for contacting the feed surface of the feed roller along side the fiber tow. The protruding flange may have a height which is substantially equal to, or greater than, the tow thickness.

An add roller apparatus, according to the invention, may include an add roller actuator, having the add roller operatively attached thereto, for selectively clamping the add roller against the feed roller. An add roller apparatus, according to the invention, may also include an add roller mounting frame, having a plurality of add roller actuators attached thereto, with each add roller actuator having an add roller attached thereto, and the add roller mounting frame being adapted for removable attachment to the fiber placement head, as a module, with the plurality of add roller actuators attached to the add roller frame.

In an add roller apparatus, according to the invention, where the fiber placement head includes a compaction roller defining a nip point movable along a fiber placement path to a location along the fiber placement path at which the tow is to be added, the fiber placement apparatus may further include a control arrangement, for anticipating the addition of a tow by the add roller and initiating clamping of the fiber tow against the surface of the feed roller prior to the nip point reaching the location along the fiber placement path at which the tow is to be added.

In some forms of the invention, the add roller may be disposed and/or configured to contact the feed roller on both sides of the fiber tow.

In a method for operating an add roller apparatus, according to the invention, for clamping a fiber tow against a feed surface of a feed roller of a fiber placement head of an automated fiber placement machine, where the fiber tow has a tow width and the feed surface has a feed surface width, the method may include, clamping the fiber tow against the feed surface of the feed roller using an add roller, of the add roller apparatus, having a width greater than the tow width and configured for bearing at least partially against the feed roller when the add roller is clamping the fiber tow against the feed surface of the feed roller. For forms of the invention wherein an add roller, according to the invention, includes a pliable peripheral surface thereof which is conformable over the fiber tow for simultaneously contacting both the fiber tow and the feed roller, a method, according to the invention, may include clamping the add roller with sufficient clamping force to cause the pliable peripheral surface of the add roller to conform over the fiber tow and achieve driving contact with the feed surface of the feed roller.

Where a fiber tow has a tow thickness, and an add roller, according to the invention, includes one or more protruding flanges, or other types of protrusions, extending outward from a peripheral surface of the add roller for contacting the feed roller along side of the fiber tow, a method, according to the invention, may include placing the protruding flange, or flanges, into driving contact with the feed surface of the feed roller.

A method, according to the invention, may include mounting a plurality of add roller actuators, according to the invention, with each add roller actuator having an add roller attached thereto, in an add roller mounting frame adapted for removable attachment to the fiber placement head, to thereby form an add roller module. The method may also include mounting the add roller module in the fiber placement head, and selectively operating one or more of the plurality of add roller actuators for clamping one or more of the add rollers, of the plurality of actuators, against the feed roller.

In a method, according to the invention, where the fiber placement head includes, a compaction roller defining a nip point movable along a tow placement path to a location along the tow placement path at which the tow is to be added, and the fiber placement machine further includes a control arrangement for anticipating the addition of a tow by an add roller, according to the invention, and initiating clamping of the fiber tow against the surface of the feed roller prior to the nip point reaching the location along the tow placement path at which the tow is to be added, the method may further include initiating clamping of the fiber tow against the surface of the feed roller prior to the nip point reaching the location along the fiber placement path at which the tow is to be added.

Other aspects, objects and advantages of the invention will be apparent upon consideration of the following detailed description of exemplary embodiments when considered in conjunction with the accompanying drawings and attachments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 4:
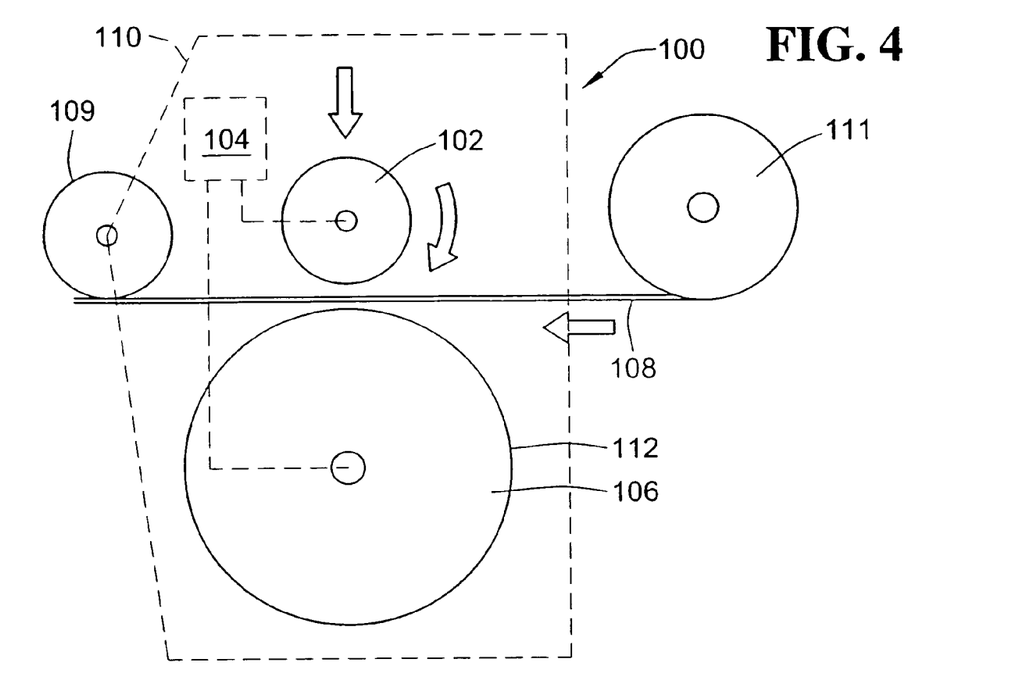
FIGS. 4 and 5 are schematic illustrations of the first exemplary embodiment of an add roller apparatus, according to the invention, having a drive arrangement operatively coupling a feed roller and an add roller of a fiber placement head, for accelerating an add roller to match its peripheral speed to the speed of a feed roller against which the add roller clamps a fiber tow to be added to a band of tows being laid down by a compaction roller of a fiber placement head of a fiber placement machine.
Figure 5:
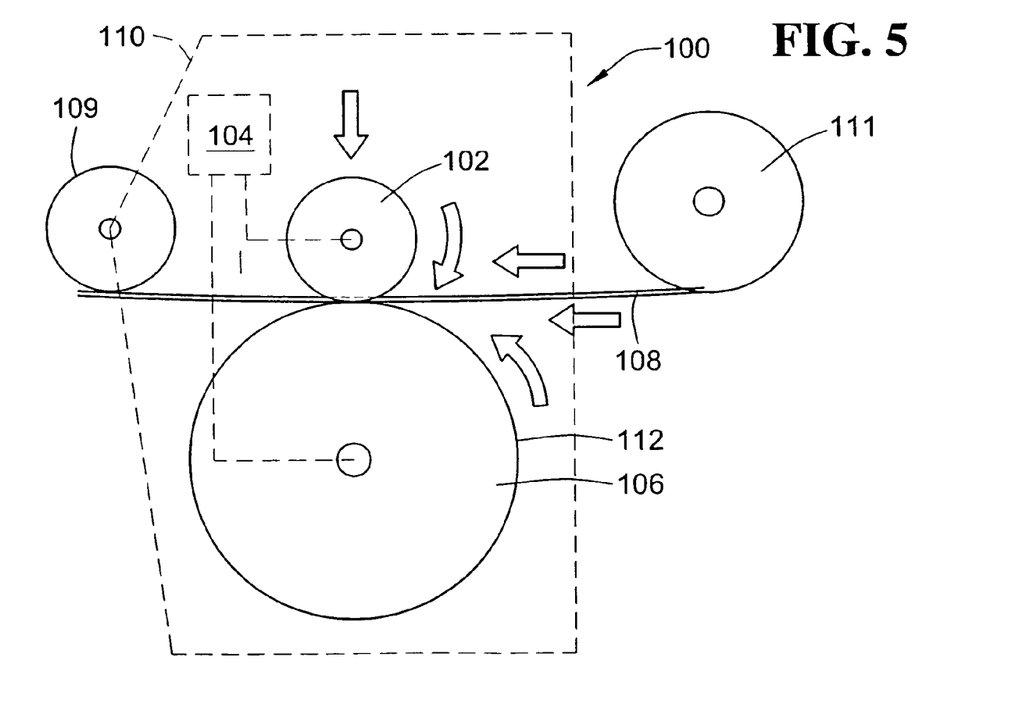

FIGS. 4 and 5 illustrate a first exemplary embodiment of an add roller apparatus 100, according to the invention, in which an add roller 102 is operatively connected by a drive arrangement 104, to a feed roller 106, of a fiber placement head 110 of a fiber placement machine (represented by the fiber placement head 110 in FIGS. 4 and 5), for clamping and driving a tow 108, extending from a spool 111, in such a manner that the peripheral speeds of the add roller 102 and the tow 108 are more quickly, efficiently, and effectively, brought up to the same peripheral speed as the feed roller 106 and the compaction roller 109 of the fiber placement head 110. The drive arrangement 104 is operatively connected between the feed roller 106 and the add roller 102, and configured in such a manner that prior to, or substantially concurrently with the add roller 102 is accelerated toward a desired peripheral speed matching the peripheral speed of a feed surface 112 of the feed roller 106. In practicing the invention, the drive arrangement 104 may take any appropriate form within the scope of the invention. In some forms of the invention, it is contemplated that the drive arrangement 104 may include a drive mechanism, including, but not limited to, a drive motor, a gear train, a belt and pulley arrangement.

In other embodiments of the invention, to be described in more detail below, the add roller may be driven by bringing portions of a peripheral surface of the add roller into direct contact with the feed roller along one or both edges of the tow.

Figure 6:
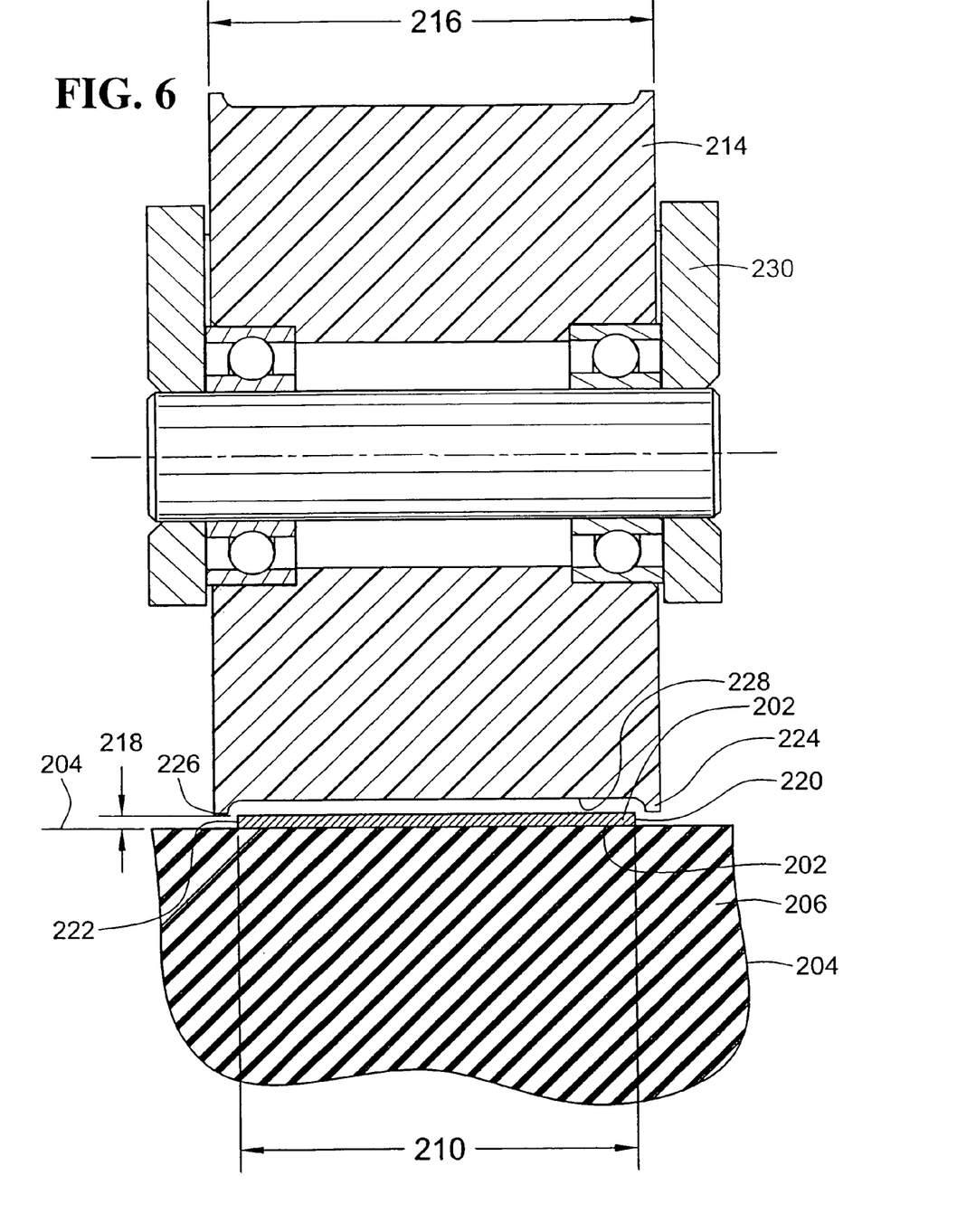
FIGS. 6-10 illustrate various aspects of the construction and operation of a second exemplary embodiment of an add roller apparatus, according to the invention, in which an add roller has a width greater than the tow width of a tow to be added, and is configured and disposed so that a portion of the add roller directly contacts a feed surface of a feed roller, to thereby form a drive arrangement for accelerating the add rollers so that its peripheral speed will match the speed of the feed surface of the feed roller.
Figure 7:
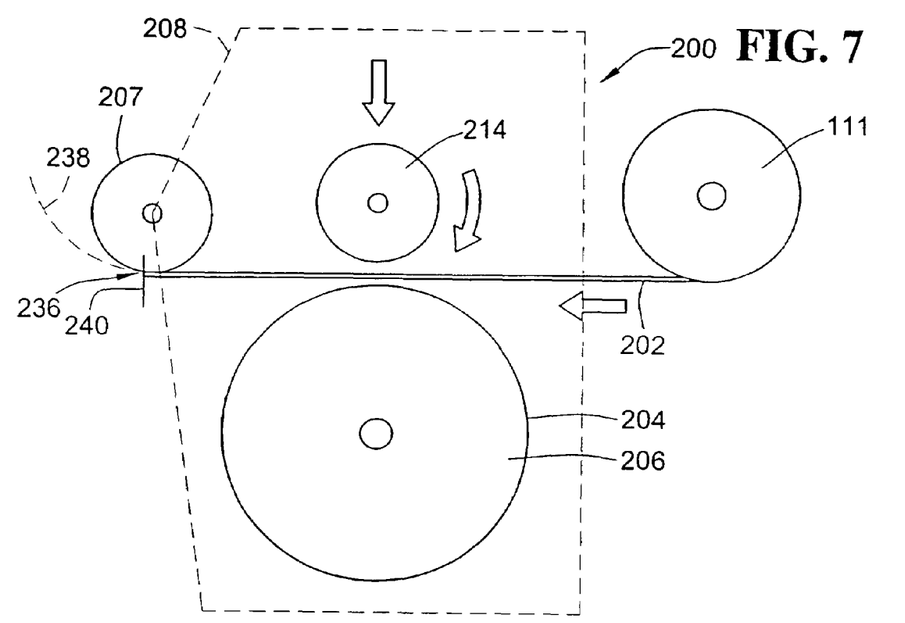
Figure 8:
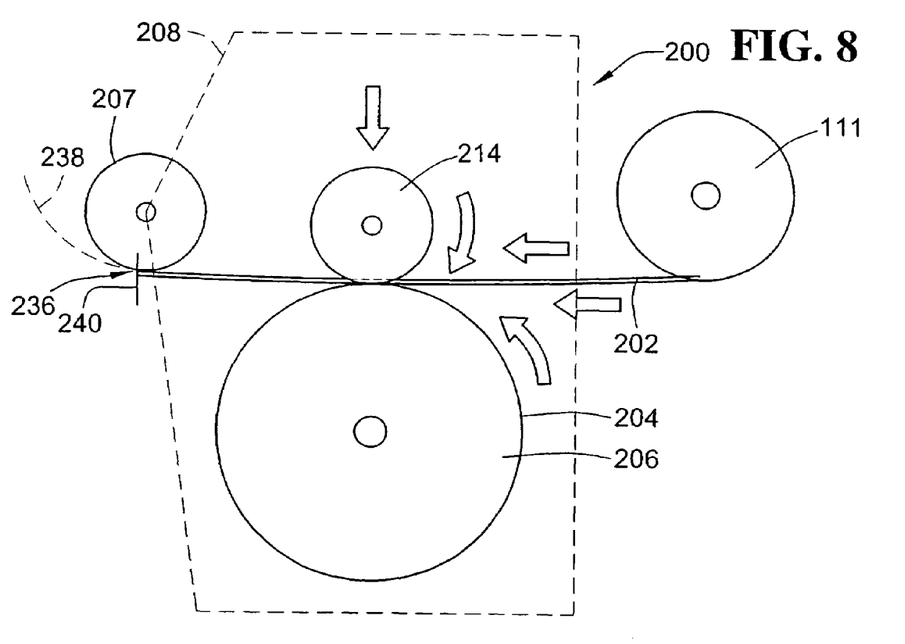

FIGS. 6-10 illustrate a second exemplary embodiment of an add roller apparatus 200, according to the invention, for clamping a fiber tow 202 against a feed surface 204 of a feed roller 206 of a fiber placement head 208 of an automated fiber placement machine, which is represented in FIGS. 7 and 8 by the fiber placement head 208. As shown in FIGS. 6-8, the fiber tow 202 has a tow width 210, and the feed surface 204, of the feed roller 206, as a feed surface width 212 which is greater than the tow width 210. The add roller apparatus 200 includes an add roller 214, having an add roller width 216, which is greater than the tow width 210, but less than the feed surface width 212, and configured for bearing at least partially against the feed surface 204 of the feed roller 206, when the add roller 214 is clamping the fiber tow 202 against the feed surface 204 of the feed roller 206. It will be appreciated, by those having skill in the art, that direct contact between portions of the add roller 214, extending beyond the tow width 210, with the feed surface 204 of the feed roller 206, form a drive arrangement for operatively driving the add roller 214 from the feed roller 206, in a manner that quickly, effectively, and efficiently brings the peripheral speed of the add roller 214 up to match the peripheral speed of the feed surface 204 of the feed roller 206.

In the second exemplary embodiment of the invention 200, where the fiber tow 202 has a tow thickness 218 thereof, and defines first and second longitudinal edges 220, 222 thereof (i.e. right and left longitudinal edges as illustrated in FIG. 6), the add roller 214 includes first and second protruding flanges 224, 226 thereof, extending outward from a peripheral surface 228 of the add roller 214 and spaced apart a distance greater than the tow width 210, for contacting the feed surface 204 of the feed roller 206 along side both the first and second longitudinal edges 220, 222 of the fiber tow 202.

It is further contemplated, that the add roller 214, of the second exemplary embodiment 200 of the invention, be fabricated at least partially from a material which is pliable, such as natural rubber or electrometric compounds such as urethane. In some forms of the invention, it will be desirable to have the protruding flanges 224, 226 as a height thereof, extending above the peripheral surface 228 of the add roller 214, substantially equal to or greater than the tow thickness 218. In some forms of the invention, it is contemplated that it may be preferable to have the height of the protruding flanges be greater than the tow thickness 218, with the flanges 224, 226 of the add roller and/or an outer portion of the feed roller 206 being configured of a pliable material, such that driving contact may be established between the add roller 214 and the feed surface 204 of the feed roller 206, for rotationally accelerating the add roller 214 prior to the peripheral surface 228 fully clamping the tow 202 against the feed surface 204.

Figure 9:
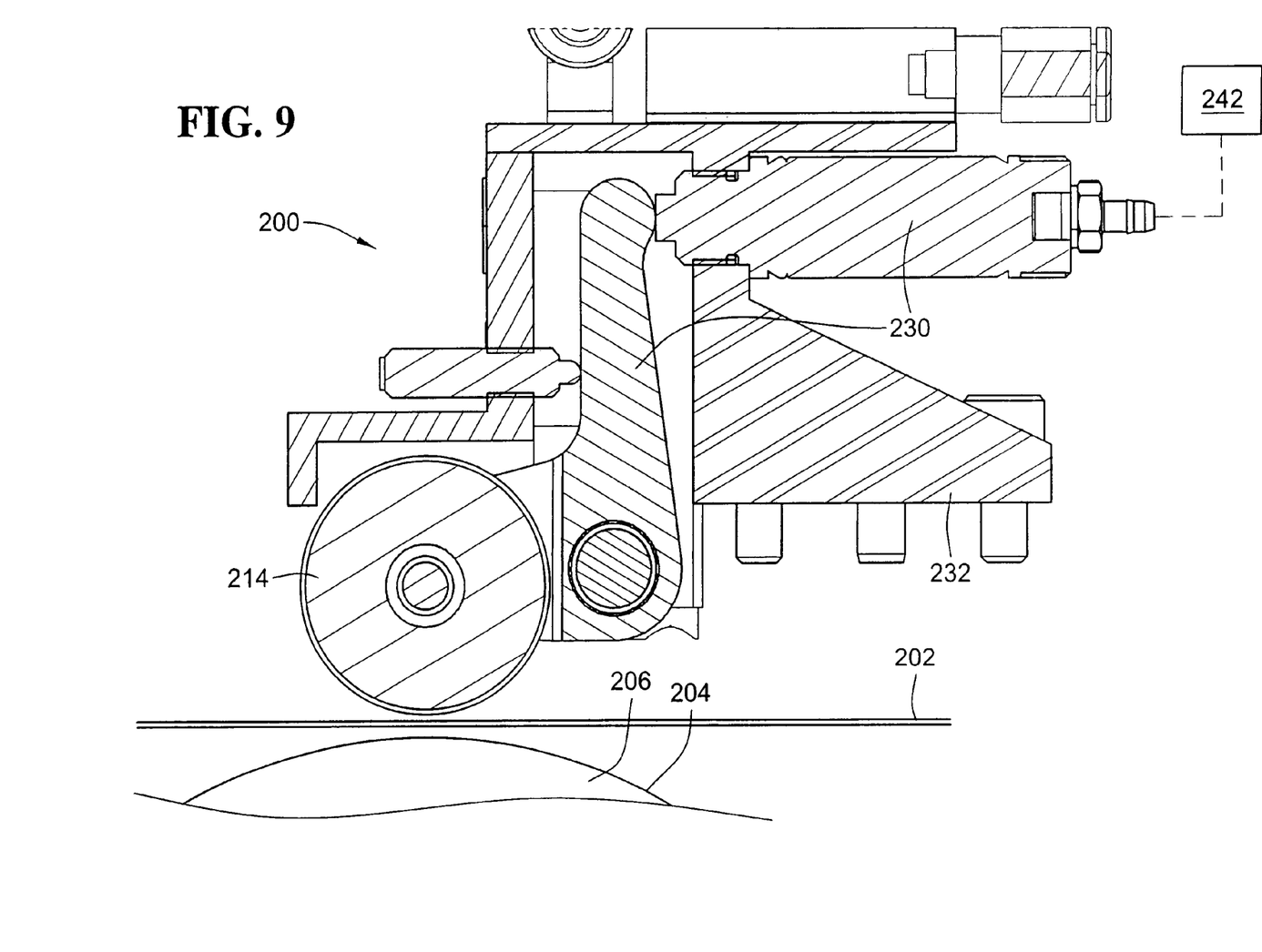

As shown in FIG. 9, the second exemplary embodiment of the add roller apparatus 200, according to the invention, may also include an add roller actuator arrangement 230, having the add roller 214 operatively attached thereto, for selectively clamping the add roller 214 against the feed roller 206.

Figure 10:
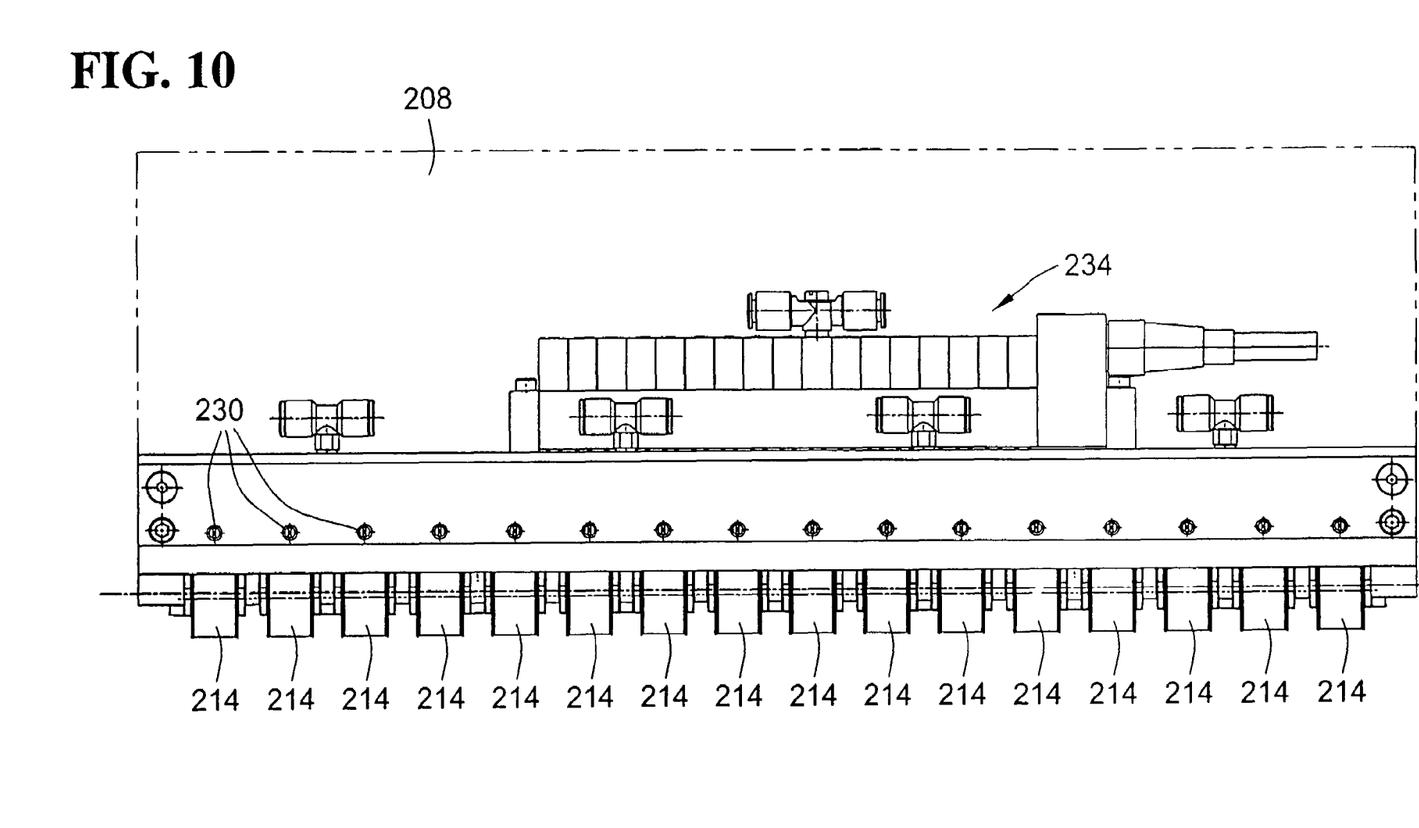

As illustrated in FIGS. 9 and 10, the second exemplary embodiment of an add roller apparatus 200, according to the invention, may also include an add roller mounting frame 232, having a plurality of add roller actuators 230 attached thereto, with each add roller actuator 230 having an add roller 214 attached thereto, with the add roller mounting frame 232 being adapted for removable attachment to the fiber placement head 208, as a module, with the plurality of add roller actuators 230 being attached to the add roller frame 232. Specifically, FIG. 10 illustrates an add roller module 234, according to the invention, having sixteen (16) add rollers 214 operatively attached by sixteen (16) add roller actuators 230 (only three (3) of which are indicated by reference numerals in FIG. 10) to the add roller mounting frame 232.

As shown in FIGS. 7-9, where the compaction roller 207 of the fiber placement head 208 defines a nip point 236, which is movable along a tow placement path 238 to a location 240 along the fiber placement path 238 at which the tow 202 is to be added, the second exemplary embodiment of the add roller apparatus 200 may further include a control arrangement 242, as indicated in FIG. 9 operatively connected to the add roller actuator arrangement 230, for anticipating the addition of the tow 202 by the add roller 214, in initiating clamping of the fiber tow 202 against the surface 204 of the feed roller 206, prior to the nip point 236 reaching the location 240 along the fiber placement path 238 at which the tow 202 is to be added.

Although the invention has been described herein in relation to certain specific exemplary embodiments thereof, those having skill in the art will recognize that the invention may also be practiced in a variety of other forms, within the scope of the invention. For example, in some forms of the invention, an add roller, according to the invention, may have a width thereof which is greater than the tow width of the tow to be clamped, with the add roller disposed in relation to the tow to contact the feed roller along only one edge of the tow to be clamped. In other forms of the invention, an add roller, according to the invention, may not include the flanges 224, 226 described above. In such instances, the add roller may include other features extending outward from the periphery of the add roller for entering into driving contact with the surface of the feed roller, or the peripheral surface of the add roller may be smooth, but include a pliable peripheral material which is conformable over the fiber tow, for simultaneously contacting both the fiber tow and the feed surface of the feed roller.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating an add roller apparatus, for clamping a fiber tow against a feed surface of a feed roller of a fiber placement head of an automated fiber placement machine, wherein the fiber tow has a tow width and the feed surface has a feed surface width, the method comprising, clamping the fiber tow against the feed surface of the feed roller using an add roller, of the add roller apparatus, having a width greater than the tow width and configured for bearing at least partially against the feed roller when the add roller is clamping the fiber tow against the feed surface of the feed roller.

2. The method of claim 1, wherein, the add roller comprises a pliable peripheral surface thereof, conformable over the fiber tow, for simultaneously contacting both the fiber tow and the feed roller, and the method further comprises, clamping the add roller with sufficient clamping force to cause the pliable peripheral surface of the add roller to conform over the fiber tow and achieve driving contact with the feed surface of the feed roller.

3. The method of claim 2, wherein, the fiber tow has a tow thickness thereof, and the add roller comprises a protruding flange thereof, extending outward from a peripheral surface of the add roller, for contacting the feed surface of the feed roller alongside of the fiber tow, and the method further comprises, placing the protruding flange into driving contact with the feed surface of the feed roller.

4. The method of claim 3, wherein, the protruding flange has a height thereof substantially equal to, or greater than, the tow thickness.

5. The method of claim 3, wherein the add roller apparatus includes an add roller actuator, having the add roller operatively attached thereto for selectively clamping the add roller against the feed roller, and the method further comprises, selectively operating the add roller actuator for clamping the add roller against the feed roller.

6. The method of claim 5, further comprising:
mounting a plurality of add roller actuators, with each add roller actuator having an add roller attached thereto, in an add roller mounting frame adapted for removable attachment to the fiber placement head, to form an add roller module;
mounting the add roller module in the fiber placement head; and
selectively operating one or more of the plurality of add roller actuators for clamping one or more of the add rollers, of the plurality of actuators, against the feed roller.

7. The method of claim 1, wherein, the fiber tow has a tow thickness thereof, and the add roller comprises a protruding flange thereof, extending outward from the peripheral surface of the add roller, for contacting the feed surface of the feed roller alongside of the fiber tow, and the method further comprises, placing the protruding flange into driving contact with the feed surface of the feed roller.

8. The method of claim 7, wherein, the protruding flange has a height thereof substantially equal to, or greater than, the tow thickness.

9. The method of claim 1, wherein the add roller apparatus includes an add roller actuator, having the add roller operatively attached thereto for selectively clamping the add roller against the feed roller, and the method further comprises, selectively operating the add roller actuator for clamping the add roller against the feed roller.

10. The method of claim 9, further comprising:
mounting a plurality of add roller actuators, with each add roller actuator having an add roller attached thereto, in an add roller mounting frame adapted for removable attachment to the fiber placement head, to form an add roller module;
mounting the add roller module in the fiber placement head; and
selectively operating one or more of the plurality of add roller actuators for clamping one or more of the add rollers, of the plurality of actuators, against the feed roller.

11. The method of claim 1, wherein:
the fiber placement head further comprises, a compaction roller defining a nip point movable along a tow placement path to a location along the tow placement path at which the tow is to be added;
the fiber placement machine further comprises a control arrangement, for anticipating the addition of a tow by the add roller and initiating clamping of the tow against the surface of the feed roller prior to the nip point reaching location along the fiber placement path at which the tow is to be added; and
the method further comprises, initiating clamping of the fiber tow against the surface of the feed roller prior to the nip point reaching location along the fiber placement path at which the tow is to be added.

* * * * *

UNITED STATES PATENT AND TRADEMARK OFFICE
CERTIFICATE OF CORRECTION

PATENT NO. : 7,628,882 B2 Page 1 of 1
APPLICATION NO. : 11/510189
DATED : December 8, 2009
INVENTOR(S) : Mark Curtis Tingley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twenty-first Day of December, 2010

David J. Kappos
*Director of the United States Patent and Trademark Office*